(12) United States Patent
Appel (10) Patent No.: US 6,232,991 B1
(45) Date of Patent: May 15, 2001

(54) ROS BOW COMPENSATION

(75) Inventor: James J. Appel, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/500,985

(22) Filed: Feb. 15, 2000

(51) Int. Cl.$^7$ .............................. G02B 26/10; B41J 2/44
(52) U.S. Cl. ..................... 347/137; 347/138; 347/259; 359/205
(58) Field of Search .................. 347/134, 137, 347/138, 241, 242, 244, 256, 257, 258, 259; 359/206, 205, 216, 822

(56) References Cited

U.S. PATENT DOCUMENTS

| | | | |
|---|---|---|---|
| 5,218,413 | 6/1993 | Kanai | 355/326 |
| 5,383,047 | 1/1995 | Guerin | 359/209 |
| 5,646,767 | * 7/1997 | Iima et al. | 359/206 |
| 6,064,504 | * 5/2000 | Minakuchi et al. | 359/210 |

OTHER PUBLICATIONS

USSN 09/116,717; filed Jul. 16, 1998; Scanline Bow Adjustment in an Optical Scanning System by Adjusting the Curvature of a Cylindrical Mirror; by Russel B. Rauch.
USSN 09/219,004; filed Dec. 21, 1998; Method and Apparatus for Image Registration in a Single Pass ROS System; by Anthony Ang et al.

* cited by examiner

Primary Examiner—Joan Pendegrass
(74) Attorney, Agent, or Firm—John M. Kelly; David E. Henn (57) ABSTRACT

Scan line bow correction for raster output scanners, and systems that use raster output scanners. Scan line bow correction is performed in raster output scanners having a post-polygon optical system that includes an f-θ lens system that has at least two multiple scan lenses by controllably tilting a second scan lens along the fast-scan axis. Beneficially, the tiltable scan lens is mounted on a mounting pad that includes a threaded hole. A threaded set screw screws into the threaded hole to provide an adjustable support. In practice the threaded hole-set screw should have a high number of threads per millimeter to provide fine bow correction adjustment.

25 Claims, 6 Drawing Sheets

ROS BOW COMPENSATION

FIELD OF THE INVENTION

This invention relates to raster output scanners. More particularly it relates to scan line bow correction.

BACKGROUND OF THE INVENTION

Electrophotographic marking is a well-known, commonly used method of copying or printing documents. Electrophotographic marking is performed by exposing a charged photoreceptor with a light image representation of a desired document. The photoreceptor is discharged in response to that light image, creating an electrostatic latent image of the desired document on the photoreceptor's surface. Toner particles are then deposited onto that latent image, forming a toner image, which is then transferred onto a substrate, such as a sheet of paper. The transferred toner image is then fused to the substrate, usually using heat and/or pressure, thereby creating a permanent record of the original representation. The surface of the photoreceptor is then cleaned of residual developing material and recharged in preparation for the production of other images.

The foregoing broadly describes a black and white electrophotographic marking machine. Electrophotographic marking can also produce color images by repeating the above process once for each color of toner that is used to make the composite color image. For example, in one color process, called the READ IOI process (Recharge, Expose, and Develop, Image On Image), a charged photoreceptive surface is exposed to a light image which represents a first color, say black. The resulting electrostatic latent image is then developed with black toner to produce a black toner image. The recharge, expose, and develop process is repeated for a second color, say yellow, then for a third color, say magenta, and finally for a fourth color, say cyan. The various latent images and color toners are placed in a superimposed registration such that a desired composite color image results. That composite color image is then transferred and fused onto a substrate.

Color electrophotographic printing can be performed in a various ways. For example, in a single pass printer wherein multiple exposure stations image the photoreceptor during a single pass of the photoreceptor through the printer. This requires a separate charging, exposing, and developing station for each color of toner. Single pass printers are advantageous in that they are relatively fast since a composite color image is produced in one pass of the photoreceptor. Alternatively, color electrophotographic printing can be performed using only a single charging station and a single exposure station by having the photoreceptor make multiple passes through the printer.

One way of exposing a photoreceptor is to use a Raster Output Scanner (ROS). A ROS is typically comprised of a laser light source (or sources), a pre-polygon optical system, a rotating polygon having a plurality of mirrored facets, and a post-polygon optical system. In a simplified description of operation, a collimated laser beam is reflected from the facets of the polygon and passed through imaging elements that project the laser beam into a finely focused spot of light on the photoreceptor's surface. As the polygon rotates, the focused spot traces a path on the photoreceptor surface referred to as a scan line. By moving the photoreceptor as the polygon rotates the spot raster scans the surface of the photoreceptor. By modulating the laser beam with image information a predetermined latent image is produced on the photoreceptor. The plane of the sweeping beam is referred to herein as the tangential plane while the direction of motion of the photoreceptor is called the sagittal direction.

Figure 1:
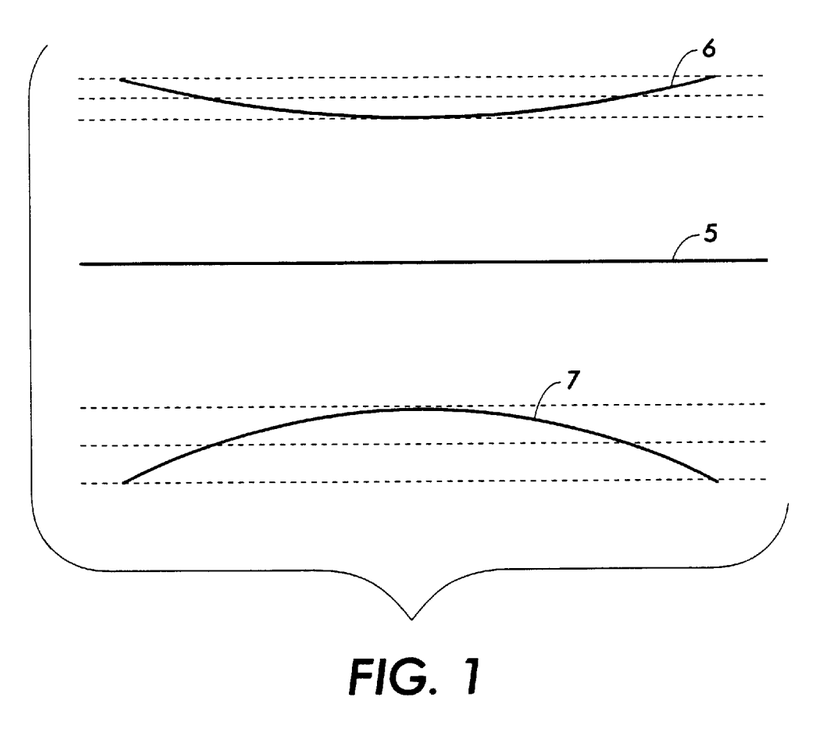
FIG. 1, which illustrates scan line bow.

Raster output scanners are typically comprised of a number of optical elements. Unfortunately, unavoidable imprecision in the shape and/or mounting of these optical elements inevitably introduces anomalies in the quality of the scan line on the photoreceptor. One such anomaly is called bow. Bow is a deviation of a scan line in the shape of a frown or a smile. FIG. 1 illustrates two scan lines having different bows, a first scan line 6 has a "smile" shaped bow while the second scan line 7 has a "frown" shaped bow. FIG. 1 also shows an ideal scan line 5 without bow. A useful measurement for bow is the deviation between the top and the bottom of the scan line. In a monochromatic system if the bow deviation is kept below about 150 microns then the bow does not create a significant print quality problem. However, in color printing, particularly when using multiple raster output scanners, such errors seriously degrade print quality. Indeed, when multiple raster output scanners are used, if one bow forms a frown while the other forms a smile, bow errors of less than 10 microns degrade the final image. In high quality systems scan line bow should be held to about 2 microns.

Typically a bow occurs when the center ray of a light beam passing through a lens does not scan along the optical axis of the lens. The farther the center ray of the beam is from the optical axis of the lens, the greater the bow. In some raster output scanners the post polygon optical system, which typically includes multiple optical elements, introduces most of the bow. It should be noted that while it is the scan line deviations from the optical axes of the post polygon optical elements that usually produces bow, almost any optical component can introduce those deviations.

Various approaches to bow correction are in the prior art. One method is to use high quality optical systems, such systems being carefully matched when multiple raster output scanners are used. However, this approach is often prohibitively expensive, particularly when machine assembly is taken into consideration. Even then, meeting a 2 micron bow deviation requirement cannot always be met. Another approach is to add an optical element into the raster output scanner's optical system. For example, U.S. Pat. No. 5,383,047 teaches the introduction of a glass plate into the pre-polygon optical system. Rotation of that glass plate corrects for bow. However, that approach requires the introduction of another piece of glass into the optical path. Furthermore, in many raster output scanners it is the post-polygon optical system that introduces most of the bow.

In view of the detrimental effects of scan line bow, and in further view of the unavoidable imprecision in optical elements and deficiencies in prior art approaches to bow correction, a new technique of correcting scan line bow would be beneficial

SUMMARY OF THE INVENTION

The principles of the present invention provide for scan line bow correction. An apparatus according to the present invention includes a raster output scanner having a laser light source, a pre-polygon optical system, a rotating, multifaceted polygon, and post-polygon optical system that includes an f-θ lens system. The f-θ lens system includes multiple scan lenses; at least one of which is selectively tiltable along the fast-scan axis. Beneficially, the tiltable scan lens is mounted on a mounting pad that includes a threaded hole. A threaded set screw screws into the threaded hole to provide an adjustable support. In practice the threaded hole-set screw should have a high number of threads per millimeter to provide fine adjustment.

BRIEF DESCRIPTION OF THE DRAWINGS

Other aspects of the present invention will become apparent as the following description proceeds and upon reference to.

DETAILED DESCRIPTION OF AN EMBODIMENT OF THE INVENTION

Figure 2:
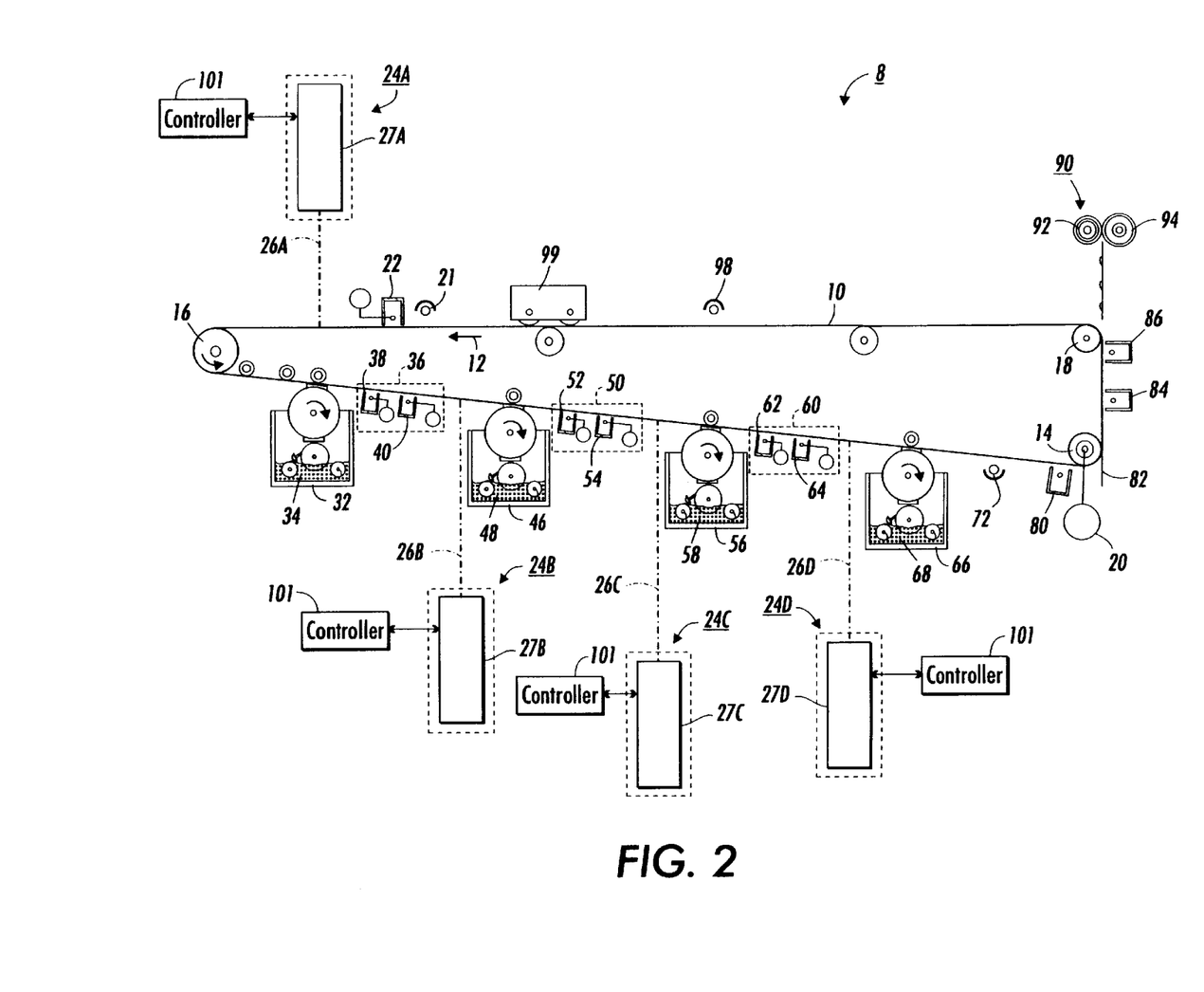
FIG. 2, which schematically illustrates a color electrophotographic printing machine suitable for incorporating the principles of the present invention.

FIG. 2 illustrates an electrophotographic printing machine 8 that reproduces an original document. Although the principles of the present invention are well suited for use in such reproduction machines, they are also well suited for use in other marking devices. Therefore it should be understood that the present invention is not limited to the particular embodiment illustrated in FIG. 2 or to the particular application shown therein.

The electrophotographic printer 8 is a single pass color electrophotographic, multipass, Recharge-Expose-and-Develop (REaD), Image-on-Image (IOI) printer. That machine includes an Active Matrix (AMAT) photoreceptor belt 10 that travels in the direction 12. Belt travel is brought about by mounting the photoreceptor belt about a driven roller 14 and about tension rollers 16 and 18, and then driving the driven roller 14 with a motor 20.

As the photoreceptor belt travels each part of it passes through each of the subsequently described process stations. For convenience, a single section of the photoreceptor belt, referred to as the image area, is identified. The image area is that part of the photoreceptor belt which is to receive the various actions and toner layers that produce the final composite color image. While the photoreceptor belt may have numerous image areas, since each image area is processed in the same way a description of the processing of one image area suffices to explain the operation of the printing machine 8.

The imaging process begins with the image area passing a "precharge" erase lamp 21 that illuminates the image area so as to cause any residual charge which might exist on the image area to be discharged. Such erase lamps are common in high quality systems and their use for initial erasure is well known.

As the photoreceptor belt continues its travel the image area passes a charging station comprised of a DC corotron 22. The DC corotron charges the image area in preparation for exposure to create a latent image for black toner. For example, the DC corotron might charge the image area to a substantially uniform potential of about −500 volts. It should be understood that the actual charge placed on the photoreceptor will depend upon many variables, such as the black toner mass that is to be developed and the settings of the black development station (see below).

After passing the charging station the image area advances to an exposure station 24A. At the exposure station the charged image area is exposed to a modulated laser beam 26A from a raster output scanner 27A that raster scans the image area such that an electrostatic latent representation of a black image is produced.

After passing the exposure station 24A the exposed image area with the black latent image passes a black development station 32 that advances black to toner 34 onto the image area so as to develop a black toner image. Biasing is such as to effect discharged area development (DAD) of the lower (less negative) of the two voltage levels on the image area. The charged black toner 34 adheres to the exposed areas of the image area, thereby causing the voltage of the illuminated parts of the image area to be about −200 volts. The non-illuminated parts of the image area remain at about −500 volts.

After passing the black development station 32 the image area advances to a recharging station 36 comprised of a DC corotron 38 and an AC corotron 40. The recharging station 36 recharges the image area and its black toner layer using a technique known as split recharging. Briefly, the DC corotron 38 overcharges the image area to a voltage level greater than that desired when the image area is recharged, while the AC corotron 40 reduces that voltage level to that which is desired. Split recharging serves to substantially eliminate voltage differences between toned areas and untoned areas and to reduce the level of residual charge remaining on the previously toned areas.

The recharged image area with its black toner layer then advances to an exposure station 24B. There, a laser beam 26B from a raster output scanner 27B exposes the image area to produce an electrostatic latent representation of a yellow image. The now re-exposed image area then advances to a yellow development station 46 that deposits yellow toner 48 onto the image area. After passing the yellow development station the image area advances to a recharging station 50 where a DC corotron 52 and an AC corotron 54 split recharge the image area.

An exposure station 24C then exposes the recharged image area. A modulated laser beam 26C from a raster output scanner 27C then exposes the image area to produce an electrostatic latent representation of a magenta image. After passing the magenta exposure station the now re-exposed image area advances to a magenta development station 56 that deposits magenta toner 58 onto the image area. After passing the magenta development station the image area advances another recharging station 60 where a DC corotron 62 and an AC corotron 64 split recharge the image area.

The recharged image area with its toner layers then advances to an exposure station 24D. There, a laser beam 26D from a raster output scanner 27D exposes the image area to produce an electrostatic latent representation of a cyan image. After passing the exposure station 24D the re-exposed image area advances past a cyan development station 66 that deposits cyan toner 68 onto the image area. At this time four colors of toner are on the image area, resulting in a composite color image. However, the composite color toner image is comprised of individual toner particles that have charge potentials that vary widely.

Directly transferring such a composite toner image onto a substrate would result in a degraded final image. Therefore it is beneficial to prepare the composite color toner image for transfer.

To prepare for transfer a pretransfer erase lamp 72 discharges the image area to produce a relatively low charge level on the image area. The image area then passes a pretransfer DC corotron 80 that performs a pre-transfer charging function. The image area continues to advance in the direction 12 past the driven roller 14. A substrate 82 is then placed over the image area using a sheet feeder (which is not shown). As the image area and substrate continue their travel they pass a transfer corotron 84 that applies positive ions onto the back of the substrate 82. Those ions attract the negatively charged toner particles onto the substrate. As the substrate continues its travel is passes a detack corotron 86. That corotron neutralizes some of the charge on the substrate to assist separation of the substrate from the photoreceptor 10. As the lip of the substrate 82 moves around the tension roller 18 the lip separates from the photoreceptor.

The substrate is then directed into a fuser 90 where a heated fuser roller 92 and a pressure roller 94 create a nip through which the substrate 82 passes. The combination of pressure and heat at the nip causes the composite color toner image to fuse into the substrate. After fusing, a chute, not shown, guides the substrate to a catch tray, also not shown, for removal by an operator.

After the substrate 82 separates from the photoreceptor belt 10 the image area continues its travel and passes a preclean erase lamp 98. That lamp neutralizes most of the charge remaining on the photoreceptor belt. After passing the preclean erase lamp the residual toner and/or debris on the photoreceptor is removed at a cleaning station 99. The image area then passes once again to the precharge erase lamp 21 and the start of another printing cycle.

In addition to the elements described above, the printer 8 also includes a system controller 101 (shown in four places in FIG. 1) that controls the overall operation of the printer. The system controller preferably comprises one or more programmable microprocessors that operate in accordance with a software program stored in a suitable memory. Of particular importance to understanding the present invention is that the system controller synchronizes the overall operation of the printer 8 and provides video information that modulates the laser beams 26A–26D.

The principles of the present invention directly relate to the raster output scanners 24A–24D. As previously explained, those raster output scanners produce scan lines on the photoreceptor that are subject to image degrading bow. The principles of the present invention are directed to reducing the differential bow among the raster output scanners. While ideally bow is completely eliminated, in practice a small bow will usually be acceptable, particularly if all of the bows are similar.

Figure 3:
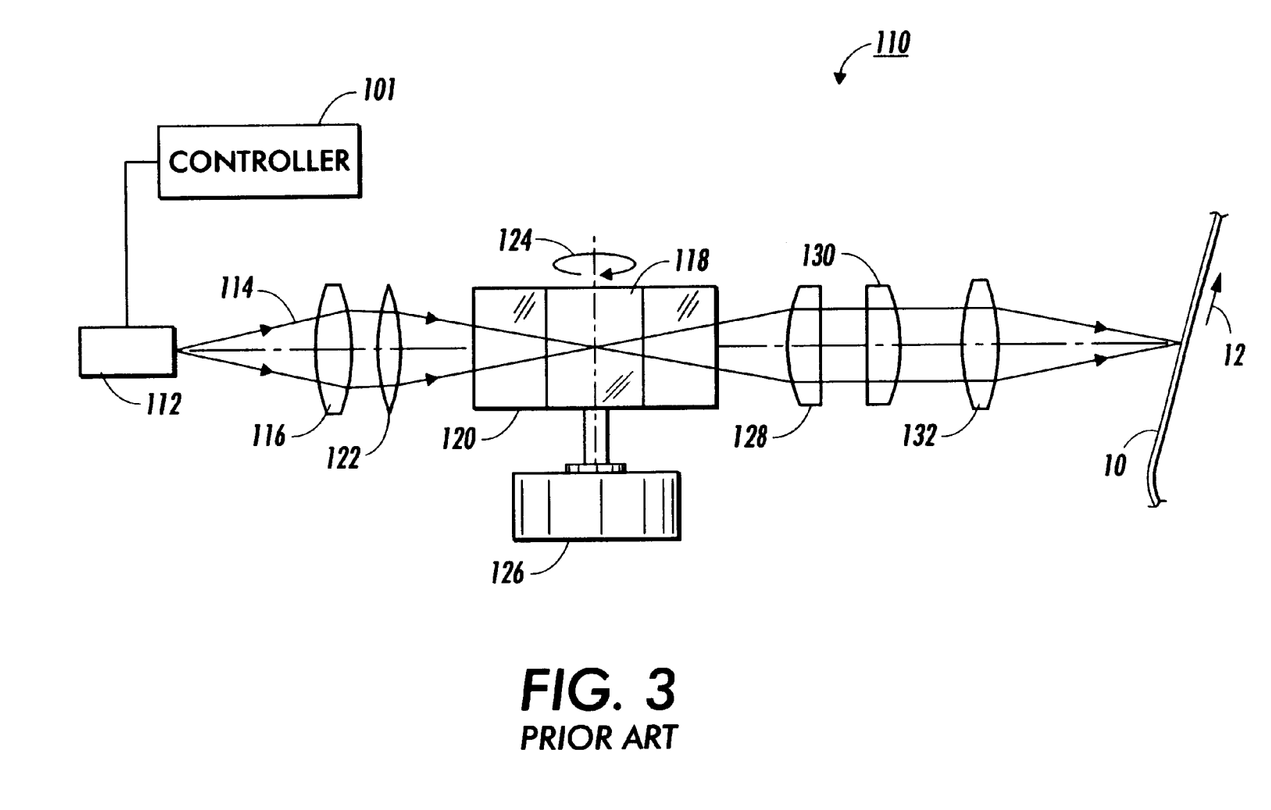
FIG. 3, which illustrates a sagittal view of a typical optical system used in a prior art raster output scanner.
Figure 4:
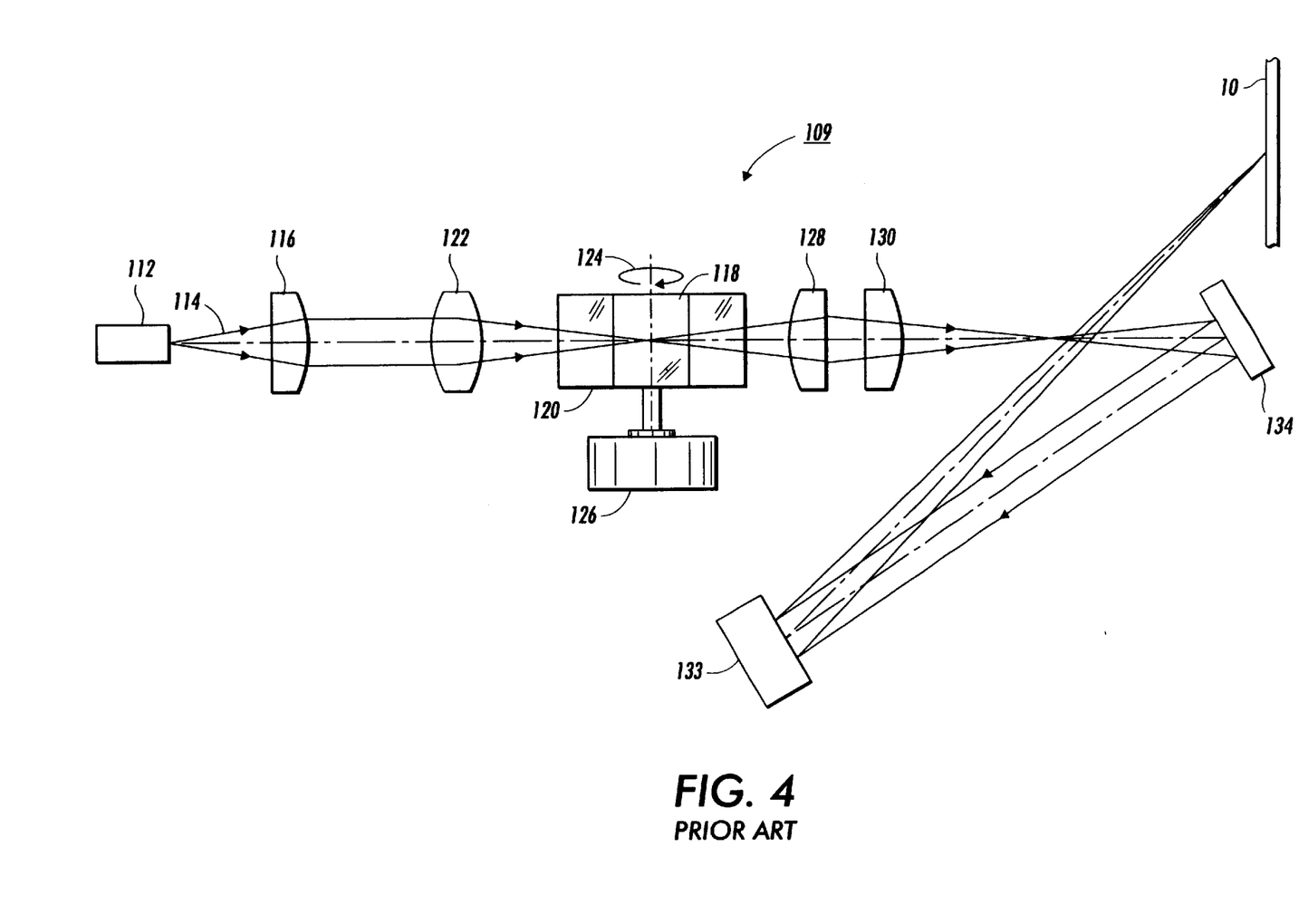
FIG. 4, which illustrates a sagittal (slow-scan) view of a typical optical system using a cylinder mirror rather than a cylinder lens.

FIG. 3 illustrates a sagittal (slow scan) view of an optical system 110 used in a prior art raster output scanner. That raster output scanner includes a laser light source 112 that produces a laser beam 114. That laser beam is collimated by a pre-polygon a spherical lens 116 and then focused onto the facets 118 of a polygon 120 by a cylindrical lens 122. The polygon is rotated in the direction 124 by a motor 126. After reflection by the facets 118 the laser beam 114 is input to an f-theta correcting optical system comprised of a first scan lens 128 and second scan lens 130. The f-theta correcting optical system is designed to improve the scan line linearity and to tailor the laser beam to provide the proper spot size on the photoreceptor 10. The illustrated optical system further includes a cylinder lens 132. Alternatively, as shown in FIG. 4, a cylinder mirror 133 could be used. Specifically, FIG. 4 shows a sagittal (slow-scan) view of an optical system 109 that is very similar to the optical system 110, except for a cylinder mirror 133 and a folding mirror 134. The folding mirror and cylindrical mirror beneficially increase the optical path length between the polygon and photoreceptor without increasing the overall length of the raster output scanner. Some designs will incorporate numerous mirrors.

Figure 5:
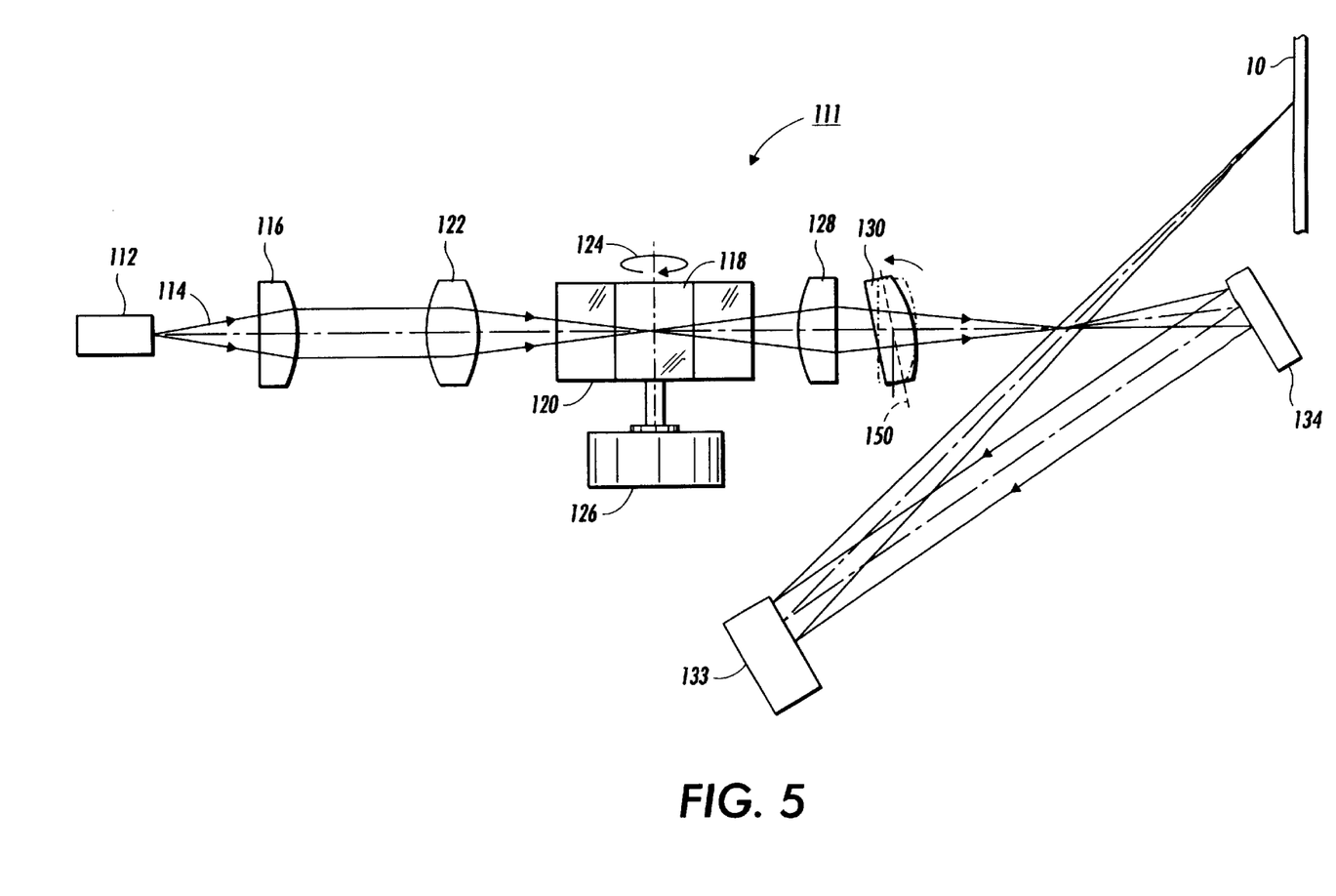
FIG. 5, which illustrates a sagittal (slow-scan) view of an optical system as used in the printing machine illustrated in FIG. 2 and which is in accord with the principles of the present invention in that a lens element is tilted to correct bow.

The source of scan line bow can be any one or any combination of the optical elements shown in FIGS. 3 and 4. However, a computer analysis performed on optical designs similar to that of FIGS. 3 and 4 showed that bow is particularly sensitive to the orientation of the second scan lens 130. FIG. 5, which shows an optical system 111, illustrates how this sensitivity is used to compensate for scan line bow. As shown, the second scan lens 130 is tilted along its fast-scan axis 150 (normal to the sagittal view of FIG. 5). By tilting the second scan lens as required, clockwise or counter-clockwise, the bow can be significantly reduced or eliminated. It should be clearly understood that the tilt illustrated in FIG. 5 is greatly exaggerated. While the exact sensitivity of bow to tilt of the second scan lens 130 will depend upon the overall system, a typical system might have 56 microns of bow change per 0.8 degree tilt change of the second scan lens.

Other advantages of correcting bow by tilting the second scan lens 130 include low image degradation and ease of adjustment. Low image degradation implies that tilting the second scan lens changes other optical parameters very little. The optical path length, focus, scan linearity, scan line length, and spot velocity are essentially unaffected. Ease of adjustment is a function of the second scan lens 130 being the "last" optical lens (unless a cylinder lens is used). This makes it easy to adjust, both mechanically and optically (since the second scan lens has relatively little optical interaction with the other optical elements). A mechanical adjustment is illustrated in FIG. 6.

Figure 6:
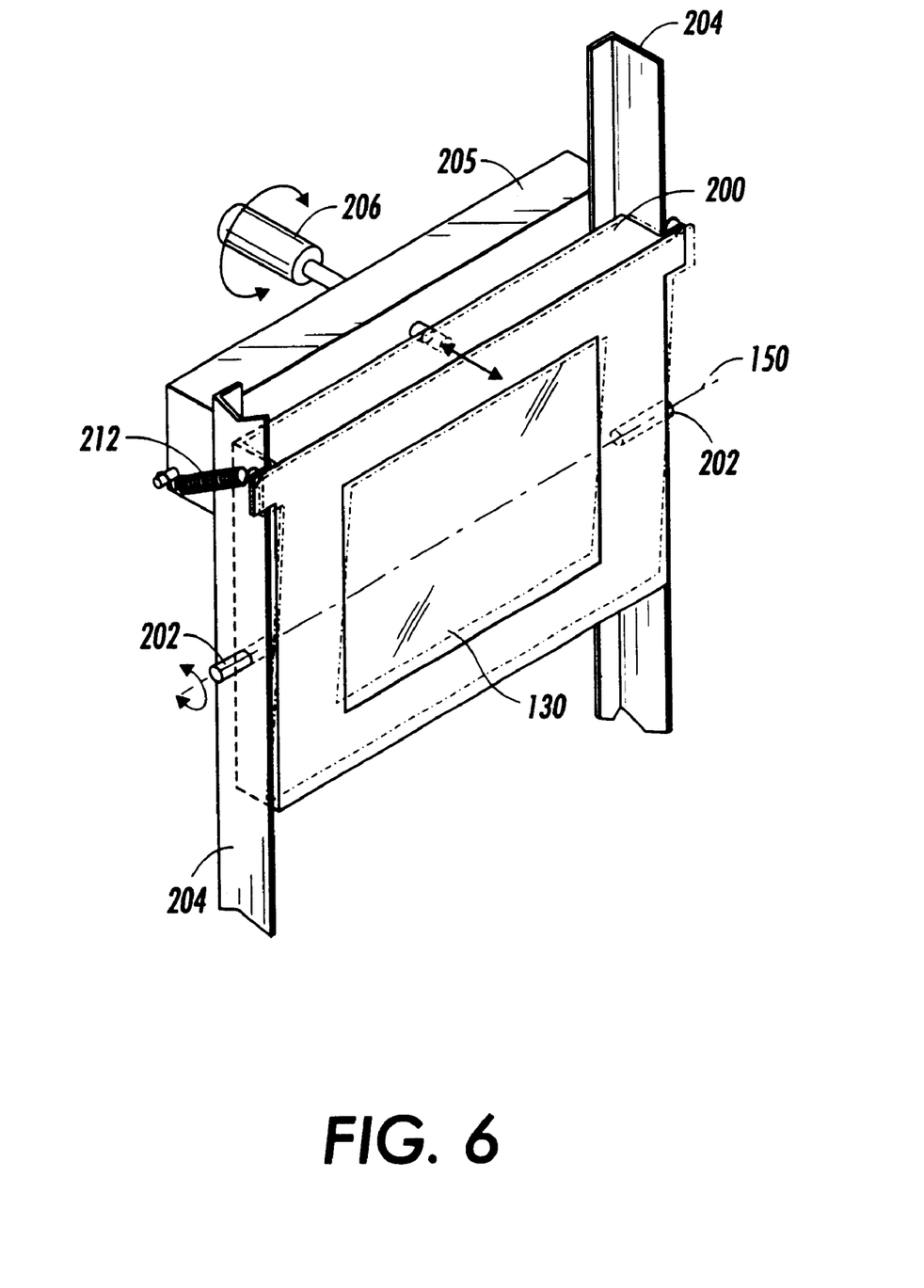
FIG. 6, which illustrates an adjustment mechanism for the optical system illustrated in FIG. 5.

As shown in FIG. 6, the second scan lens 130 is mounted in a mounting pad 200. That pad is connected to a machine frame 204 using pins 202 such that the second scan lens 130 can tilt along an axis in the fast scan direction. The mounting pad is located such that the laser beam passes near or through the center of the second scan lens 130. The mounting pad is beneficially comprised of a vibration dampening material such as a rubber compound. Passing through an arm 205 of the machine frame 204 is a threaded adjustment screw 206. The adjustment screw is "captured" by the top of the mounting pad. Turning the adjustment screw causes the second scan lens to tilt along a fast scan axis in one direction. Rotation of the adjustment screw counter-clockwise causes the second scan lens to tilt along a fast scan axis in the other direction. Because of the sensitivity of scan line bow to the tilt of the second scan lens, the screw 206 should have a high number of threads per millimeter. For example, a tilt of about 0.8° might cause a 56 micron change in bow. A spring 212 that biases the mounting pad toward the arm 205 can be used to reduce screw backlash.

It is to be understood that while the figures and the foregoing description illustrate the present invention, they are exemplary only. Others who are skilled in the applicable arts will recognize numerous modifications and adaptations of the illustrated embodiment that will remain within the principles of the present invention. Therefore, the present invention is to be limited only by the appended claims.

What is claimed:

1. A raster output scanner comprising:

a light source emitting a light beam;

a pre-polygon optical system for collimating said emitted light beam;

a rotating, multifaceted polygon for deflecting said collimated light beam in a scan line plane;

a post-polygon optical system including a first scan lens and a second scan lens, said post-polygon optical system for focusing said deflected light beam into a moving spot on a scan plane and for improving the linearity of the movement of said spot;

a cylinder element for correcting wobble of said spot; and an adjustable mounting pad supporting the second scan lens and that allows tilting of the second scan lens in response to operation of an adjustment member, wherein said second scan lens is adjusted to reduce scan line bow in the scan plane.

2. A raster output scanner according to claim 1, wherein said mounting pad is tiltable along a fast scan axis.

3. A raster output scanner according to claim 1, wherein said adjustment member is a threaded member.

4. A raster output scanner according to claim 3, wherein said threaded member is a screw.

5. A raster output scanner according to claim 1, wherein said cylinder element is a mirror.

6. The raster output scanner of claim 1 further including:

a pivot mount of the mounting pad pivotably supporting the second scan lens about a lens pivot axis;

an adjustment member support in the mounting pad arranged so that operation of the adjustment member causes the second scan lens to pivot in the pivot mount about the lens pivot axis.

7. The raster output scanner of claim 6 wherein the pivot mount is a pin rotatably extending through a side of the mounting pad and supportingly engaging the second scan lens.

8. The raster output scanner of claim 6 wherein the adjustment member support is a threaded hole in a member of the mounting pad parallel to the lens pivot axis.

9. An imaging station, comprising:

a photoreceptor moving in a slow scan direction; and a raster output scanner for producing scan lines in a fast scan direction that is substantially perpendicular to said slow scan direction, said raster output scanner, including:

a light source emitting a light beam;

a pre-polygon optical system for collimating said emitted light beam;

a rotating, multifaceted polygon for deflecting said collimated light beam in a scan line plane;

a post-polygon optical system receiving said deflected light beam and for focusing said deflected light beam as a moving spot that traces scan lines on said photoreceptor, said post-polygon optical system includes a first scan lens and a second scan lens; and an adjustable mounting pad supporting the second scan lens and that allows tilting of the second scan lens in response to operation of an adjustment member, wherein said second scan lens is adjusted to reduce the bow of said scan line.

10. An imaging station according to claim 9, further including a cylinder element between said post-polygon optics and said photoreceptor, said cylinder element for correcting spot wobble.

11. An imaging station according to claim 9, wherein said post-polygon optical system improves scan line linearity.

12. An imaging station according to claim 9, wherein said mounting pad is tiltable along a fast scan axis.

13. An imaging station according to claim 9, wherein said mounting pad tilt is adjusted by a threaded member.

14. An imaging station according to claim 13, wherein said threaded member is a screw.

15. An imaging station according to claim 9, wherein said cylinder element is a mirror.

16. The raster output scanner of claim 9 further including:

a pivot mount of the mounting pad pivotably supporting the second scan lens about a lens pivot axis;

an adjustment member support in the mounting pad arranged so that operation of the adjustment member causes the second scan lens to pivot in the pivot mount about the lens pivot axis.

17. The raster output scanner of claim 16 wherein the pivot mount is a post rotatably extending through a side of the mounting pad and supportingly engaging the second scan lens.

18. The raster output scanner of claim 16 wherein the adjustment member support is a threaded hole in a member of the mounting pad parallel to the lens pivot axis.

19. A printer, comprising:

a photoreceptor moving in a slow scan direction;

a charging station for charging an image area of said photoreceptor;

an exposure station for exposing said image area so as to form a latent image, said exposure station including a raster output scanner for producing scan lines in a fast scan direction that is substantially perpendicular to said slow scan direction, said raster output scanner, including:

a light source emitting a light beam;

a pre-polygon optical system for collimating said emitted light beam;

a rotating, multifaceted polygon for deflecting said collimated light beam in a scan line plane; and a post-polygon optical system receiving said deflected light beam and for focusing said deflected light beam as a moving spot that traces scan lines on said photoreceptor, said post-polygon optical system includes a first scan lens and a second scan lens;

a developer for depositing toner onto said latent image so as to form a toner image;

a transfer station for transferring said toner image onto a substrate;

a fusing station for fusing said toner image with said substrate;

a cleaning station for cleaning said photoreceptor; and an adjustable mounting pad supporting the second scan lens and that allows tilting of the second scan lens in response to operation of an adjustment member, wherein said second scan lens is adjusted to reduce the bow of said scan line.

20. A printer according to claim 19, wherein said exposure station further includes a cylinder element between said post-polygon optics and said photoreceptor, said cylinder element for correcting spot wobble.

21. A printer according to claim 19, wherein said post-polygon optical system improves scan line linearity.

22. A printer according to claim 19, wherein said mounting pad is tiltable along a fast scan axis.

23. A printer according to claim 19, wherein said mounting pad tilt is adjusted by a threaded member.

24. A printer according to claim 23, wherein said threaded member is a screw.

25. A printer according to claim 19, wherein said cylinder element is a mirror.

* * * * *